US007231056B2

(12) United States Patent
Chen

(10) Patent No.: US 7,231,056 B2
(45) Date of Patent: Jun. 12, 2007

(54) EAR-HOOK EARPHONE WITH MICROPHONE

(75) Inventor: Kuo-Chung Chen, Taipei Hsien (TW)

(73) Assignee: JDI Jing Deng Industrial Co., Ltd., Taipei Hsien (TW)

( * ) Notice: Subject to any disclaimer, the term of this patent is extended or adjusted under 35 U.S.C. 154(b) by 296 days.

(21) Appl. No.: 10/781,734

(22) Filed: Feb. 20, 2004

(65) Prior Publication Data

US 2005/0185814 A1 Aug. 25, 2005

(51) Int. Cl.
*H04M 3/00* (2006.01)

(52) U.S. Cl. ....................... 381/381; 381/375; 381/374

(58) Field of Classification Search ................. 381/3.7, 381/374–381, 385; 379/430
See application file for complete search history.

(56) References Cited

U.S. PATENT DOCUMENTS 4,972,467 A * 11/1990 Nakagawa et al. .... 379/406.08
5,210,792 A * 5/1993 Kajihara ..................... 379/430
5,412,736 A * 5/1995 Keliiliki ..................... 381/381
5,625,171 A * 4/1997 Marshall ..................... 181/130
5,729,615 A * 3/1998 Yang .......................... 381/370
5,761,298 A * 6/1998 Davis et al. ................ 379/430
6,097,827 A * 8/2000 Yang .......................... 381/375
6,363,158 B1 * 3/2002 Lu ............................. 381/381
6,427,018 B1 * 7/2002 Keliiliki ..................... 381/381
2002/0048385 A1 * 4/2002 Rosenberg .................. 381/374
2002/0080989 A1 * 6/2002 Chi-Lin ....................... 381/374
2003/0002706 A1 * 1/2003 Keliiliki ..................... 381/381
2005/0100185 A1 * 5/2005 Connors et al. ............ 381/381

* cited by examiner

*Primary Examiner*—Curtis Kuntz
*Assistant Examiner*—P. Dabney
(74) *Attorney, Agent, or Firm*—Troxell Law Office PLLC

(57) ABSTRACT

An adjustable ear-hook earphone with a microphone is disclosed. The apparatus includes an ear hook, a main body and a microphone, wherein the main body have a limiting part and an adjusting post sleeved in a sleeve of the ear hook, thereby the main body are adjustable and moveable in a specific angle ranged from 0 to 210 degrees.

9 Claims, 8 Drawing Sheets

EAR-HOOK EARPHONE WITH MICROPHONE

BACKGROUND OF THE INVENTION a) Field of the Invention

The present invention discloses an earphone with microphone, especially to an adjustable ear-hook earphone with microphone.

b) Description of the Prior Art

An earphone with microphone combines both the function of the earphone with the microphone. The conventional earphones with microphone is classified into headworn type, in-ear type and ear-hook type. The headworn microphone is a headset earphone with a microphone extending from one side of the enclosure thereof. Although the placement of the microphone is adjustable and the earflaps are not so easy to fall off, such type is just suitable for static users. The headset is held on users' head only by the earphones on two ends of the frame without any other parts for securing. Moreover, the earphone is easy to come off while the users are jumping or jerking their heads. Thus it is not fit for those in movement or with hats on their heads.

The in-earphone for special agents is composed by an earphone inside the ear canal, a signal wire around users' neck, and a microphone clipped on the neck or shirtband. Due to the scattered parts, the device is difficult to use and store. Not only the earphone is easy to fall off but also the wire is easy to be broken. The position of the microphone is inconvenient to fix. Therefore, the device is unfitting for those who desire freedom of movement such as policemen and soldiers.

As to the ear-hook microphone, the microphone is over-the-ear and is attached on users' ear by an auriform hook for communication. Compared with other types of earphones, such type microphone provides much firmly attachment. However, the shape of the ear-hook can't be adjusted for best fit and required comfort on users' ear.

Therefore, there is a need to provide an earphone with a microphone that is simple, easy for assembling and attaching, convenient to be adjusted and won't come off easily.

SUMMARY OF THE INVENTION

It is a primary object of the present invention to provide an adjustable ear-hook earphone with a microphone whose structure is simple, easy for assembling and attaching. The microphone and the earphone are convenient to be adjusted for optimum placement and once being positioned, not come off easily.

In order to achieve the object mentioned above, the present invention provides an adjustable ear-hook earphone with a microphone having a C-shaped hook with a sleeve on top end thereof, a wire entry, a wire exit, and a wire channel are arranged on upper part of the C-shaped hook in tangential direction. The main body of the earphone has a speaker mounted on lateral side and a limiting part extending from top side thereof. An adjusting post clipped on the lateral side of the limiting part. The outer diameter of the adjusting post is corresponding to the inner diameter of the sleeve so that the adjusting post is sleeved into the sleeve to allow the main body of earphone turning left or right in a certain angle as well as moving upwards or downwards for optimum placement. One end of a flexible tube is pivoted to the lateral side of the main body of earphone and is extending downwards while the other end thereof is connected with a microphone. The flexible tube swings to and fro. A signal wire passes through the entry, the wire channel, the wire exit, and then connects to the main body of earphone.

It is a further object of the present invention to provides an adjustable ear-hook earphone with a microphone that is simple, easy for assembling and adjustment to the optimum placement, and convenient to use.

The invention includes a C-shaped hook with a sleeve on top end thereof, a wire entry, a wire exit, and a wire channel are arranged on upper part of the C-shaped hook in tangential direction. The main body of the earphone has a speaker mounted on lateral side and a limiting part extending from top side thereof. An adjusting post is clipped on lateral side of the limiting part. The outer diameter of the adjusting post is corresponding to the inner diameter of the sleeve so as to insert the adjusting post into the sleeve and allow the main body of earphone turning right or left in a certain angle as well as moving upwards or downwards for optimum placement.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DETAILED DESCRIPTION OF THE PREFERRED EMBODIMENT

The present invention relates to an ear-hook earphone with a microphone that is convenient for use and is perfect fit. According to users' need, the hook and the earphone adjust to any height and direction.

Figure 1A:
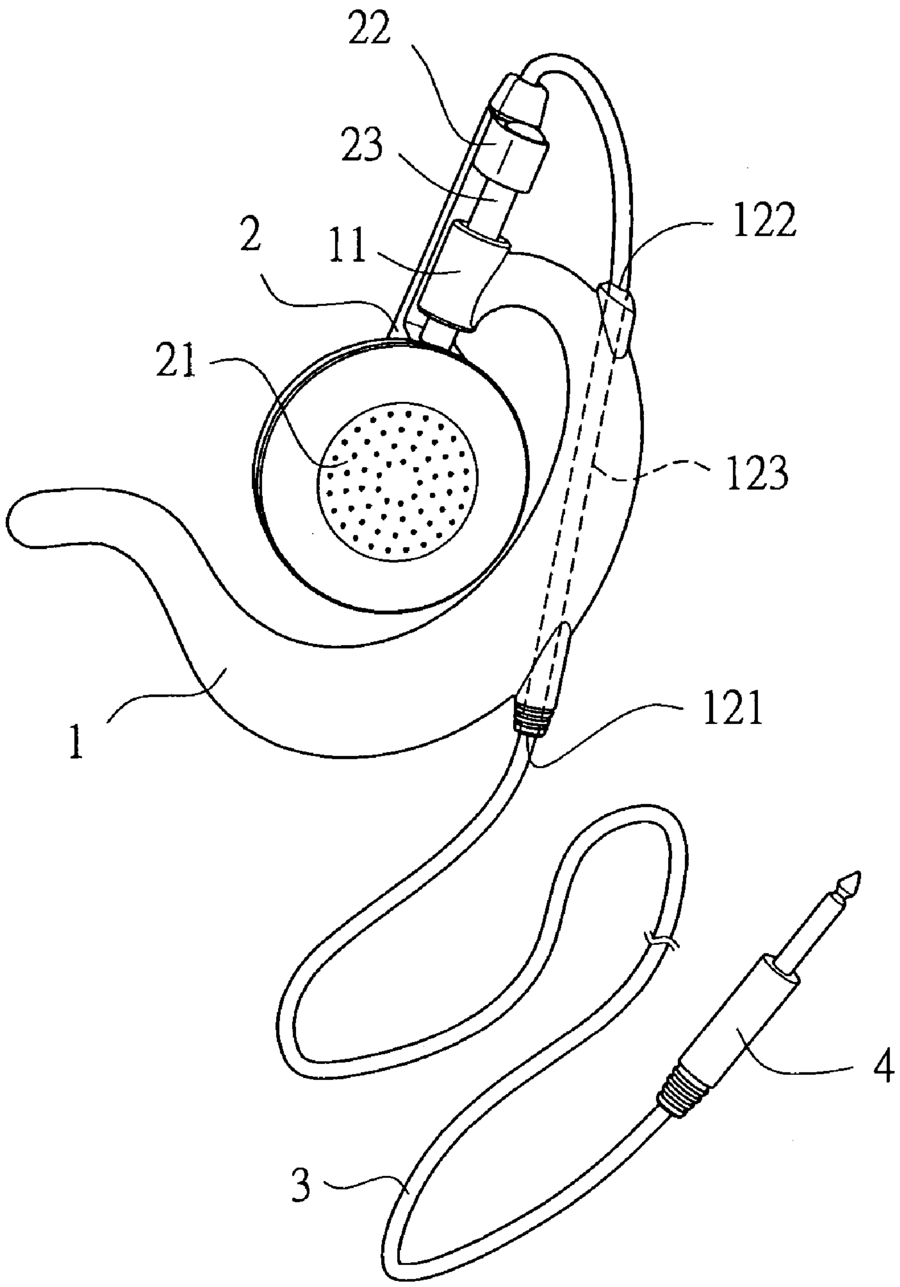
FIG. 1(*a*) & FIG. 1(*b*) show an embodiment of an adjustable ear-hook earphone in accordance with the present invention.
Figure 1B:
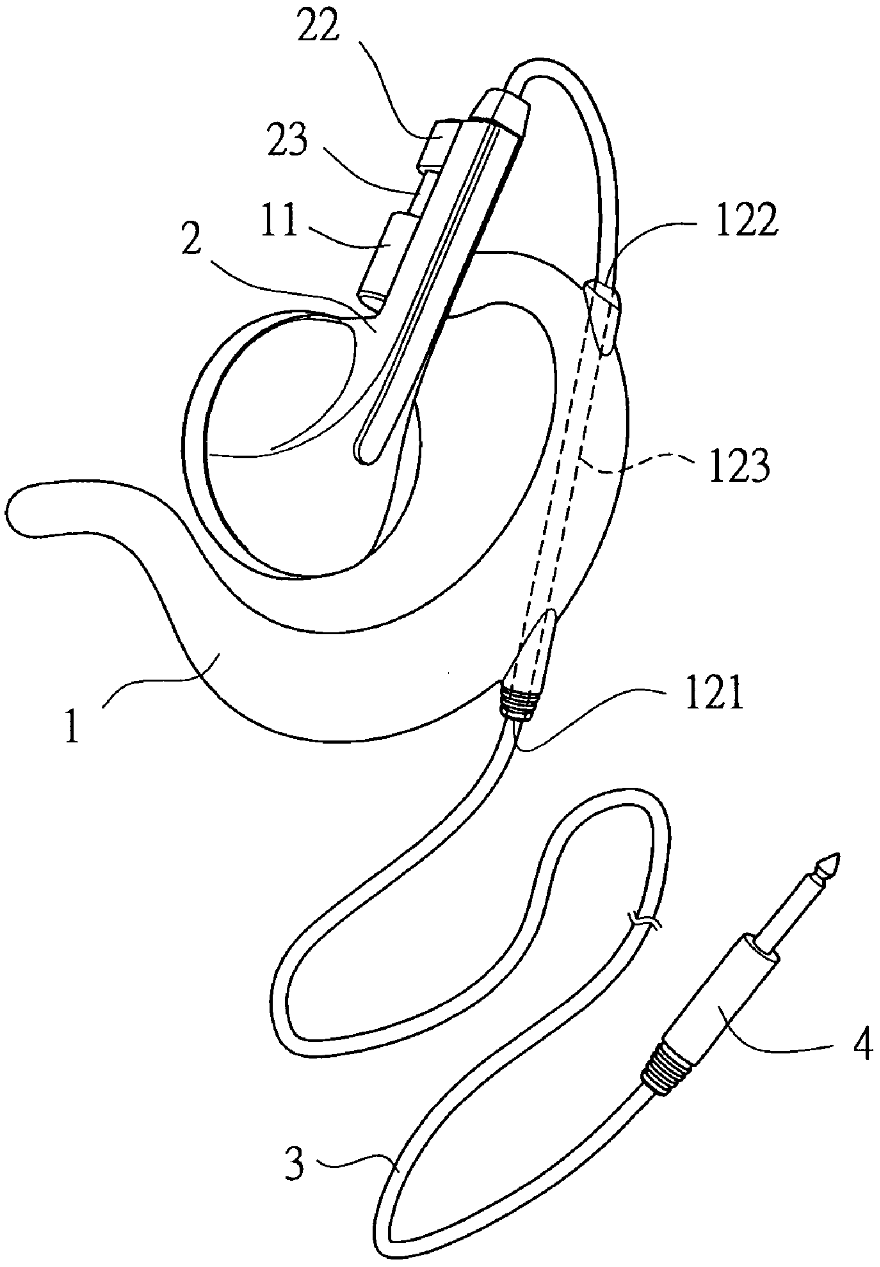

Refer to FIG. 1(*a*) & FIG. 1(*b*), the present invention is composed by a C-shaped hook 1 with a sleeve 11 on top end thereof, a wire entry 121, a wire exit 122, and a wire channel 123 are arranged on upper part of the C-shaped hook 1 in tangential direction, a main body of earphone 2 with a speaker 21 on lateral side and a limiting part 22 extending from top side thereof. An adjusting post 23 whose outer diameter is corresponding to the inner diameter of the sleeve 11 is clipped on side of the limiting part 22 and is sleeved into the sleeve 11 so as to allow the main body 2 moving upwards or downwards as well as turning right or left in a certain angle for optimum placement. A signal wire 3 inserts through the wire entry 121, the wire channel 123, the wire exit 122 and then connects with the main body 2 of earphone. The FIG. 1(*a*) & FIG. 1(*b*) show the embodiments for applying on the right and left ear respectively.

Figure 2A:
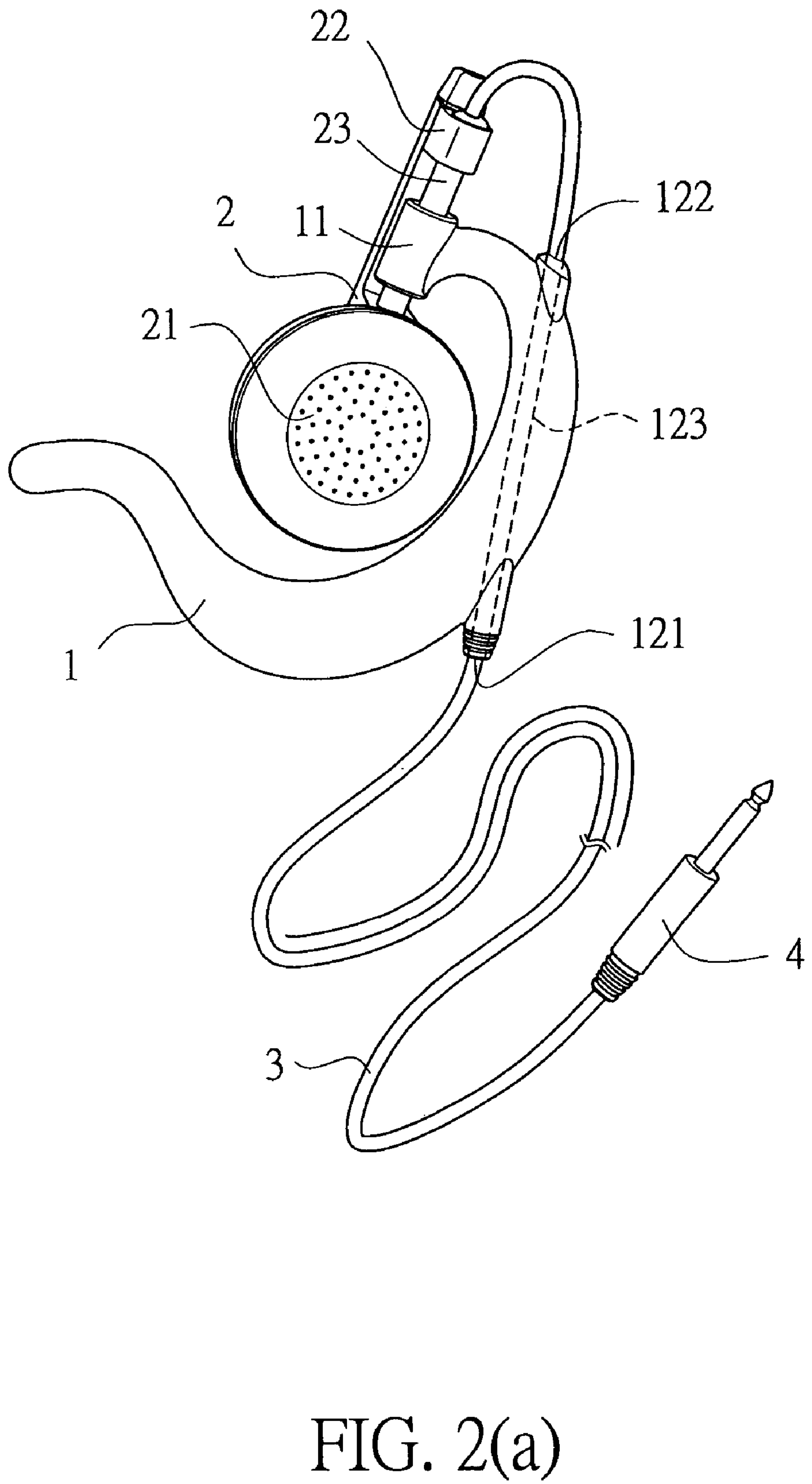
FIG. 2(*a*) & FIG. 2(*b*) show another embodiment of an adjustable ear-hook earphone in accordance with the present invention.
Figure 2B:
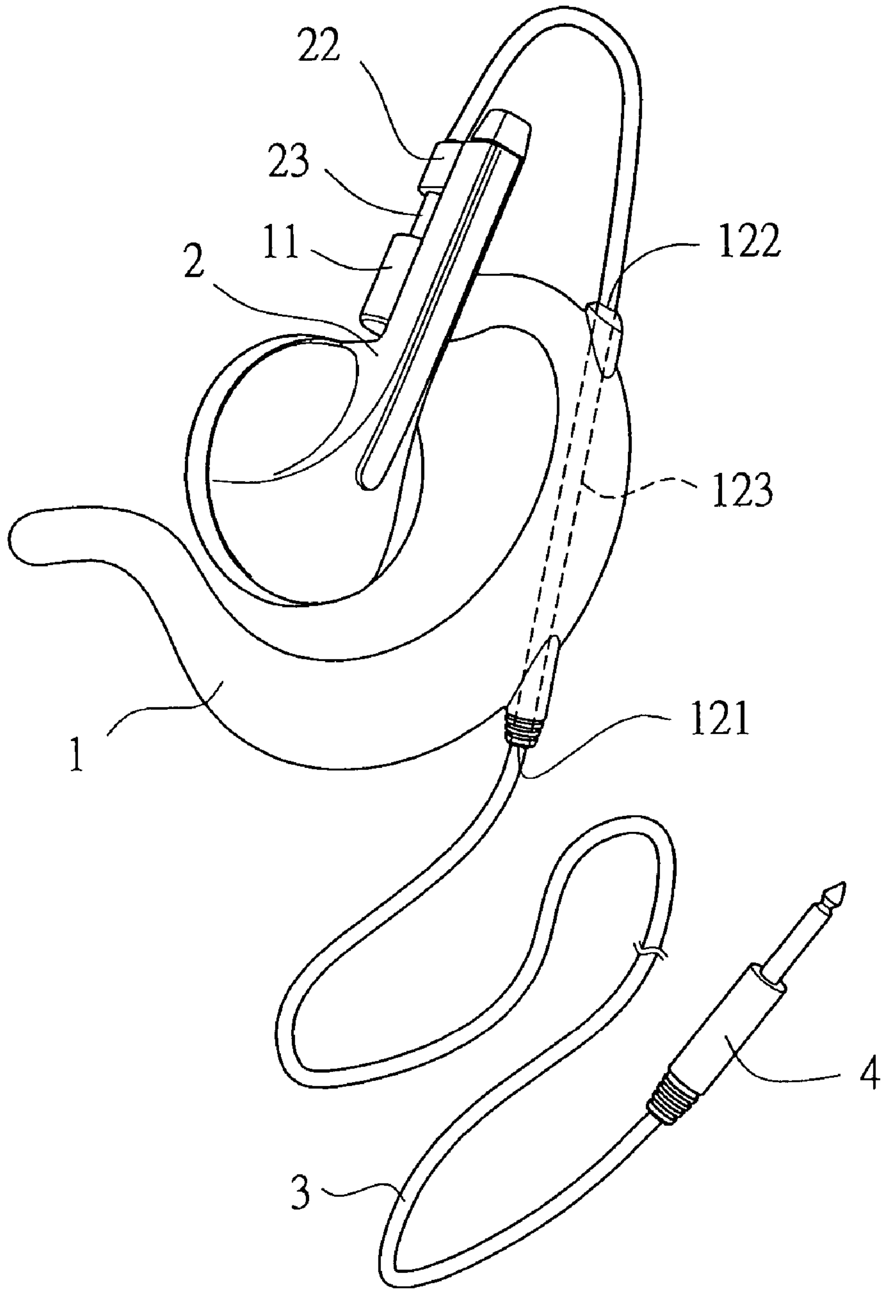

When being used, the limiting part 22 of the main body of earphone 2 further having a wire accommodating slot or channel (not shown in figure) for housing the signal wire 3 therein. The signal wire 3 is connected to the main body 2 through the wire accommodating slot or the adjusting post 23, as the embodiments shown in FIG. 2(*a*) & 2(*b*). The hollow channel (not shown in the figure) is mounted inside the adjusting post 23 for lodging the signal wire 3. The other end of the signal wire 3 is connected with a plug 4 (or an audio set). The FIG. 2(*a*) & FIG. 2(*b*) show the embodiments for applying on the right and left ear respectively.

In accordance with the description mentioned above, the structure of the present invention is simple and easy for assembling. When being assembled, the adjusting post 23 is sleeved in the C-shaped hook 1, then the speaker 21 is mounted in the slot of the main body of earphone 2. When being used, the main body of earphone 2 is fit on user's ear by the hook 1 firmly and the speaker 21 can be adjusted to optimum position. The signal wire 3 won't fall off as easy as that of a prior art.

Moreover, the signal wire 3 inserts into the wire entry 121, through the wire channel 123, extends out of the wire exit 122. There is friction between the signal wire 3 and the inner wall of the wire entry 121 as well as the wire exit 122 so as to prevent the wire 3 from being unset or broken. When there is a certain angle between the direction of the signal wire 3 being pulled and that of the wire entry 121 or the wire exit 122, the friction is larger.

The main body of earphone 2 and the hook 1 are restricted by the limiting part 22 and the adjusting post 23 so as to prevent the rotation of the signal wire 3 between the hook 1 and the main body of earphone 2 in 360 degrees. This also avoids the tangling or breakage of the signal wire 3. Due to the limiting part 22 and the adjusting post 23, the main body of earphone 2 can be adjusted in 210 degrees corresponding to the hook 1 thus the present invention can be applied on the right or left ear according to user's needs.

Figure 3A:
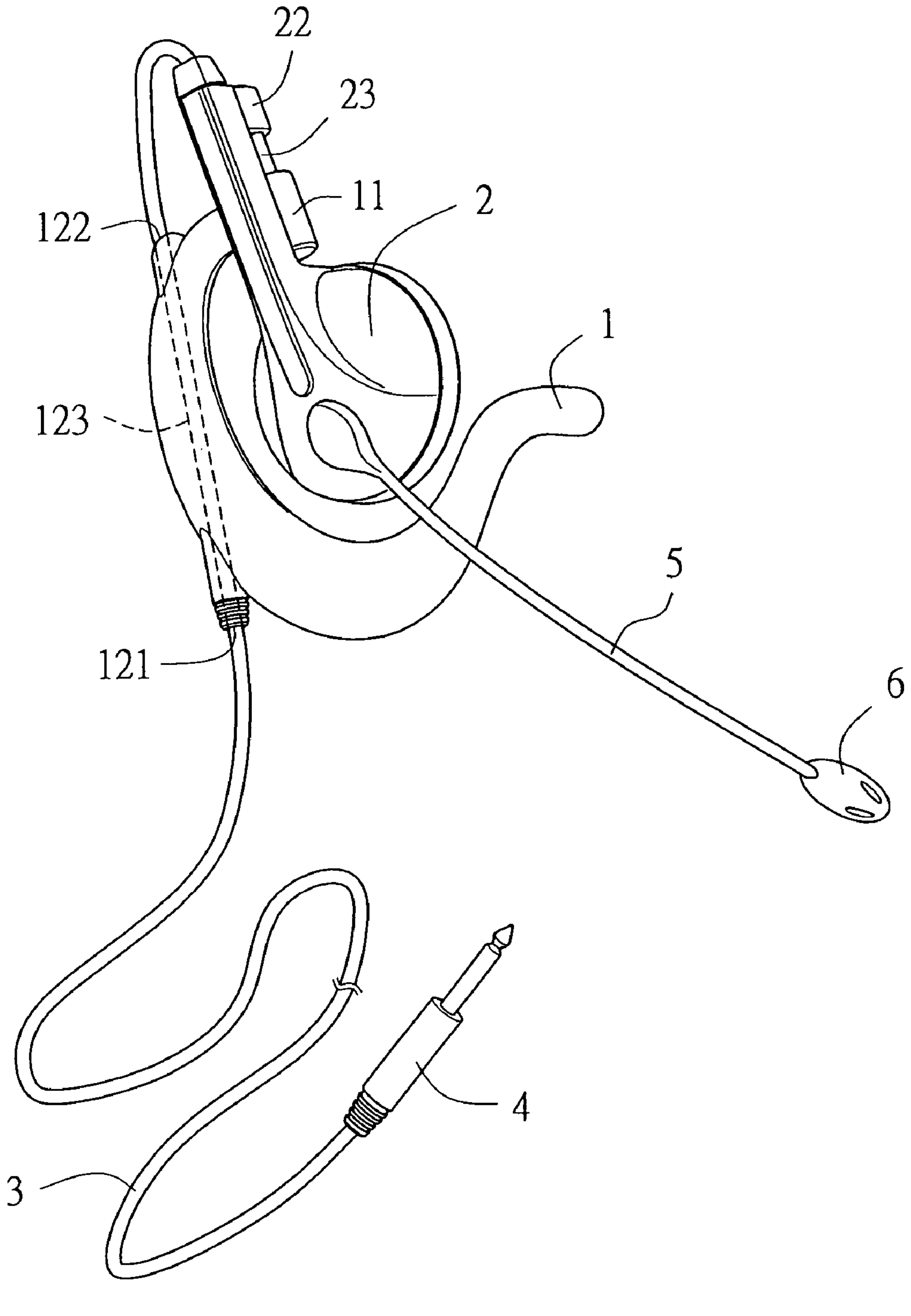
FIG. 3(*a*) & FIG. 3(*b*) show a further embodiment of an adjustable ear-hook earphone in accordance with the present invention.
Figure 3B:
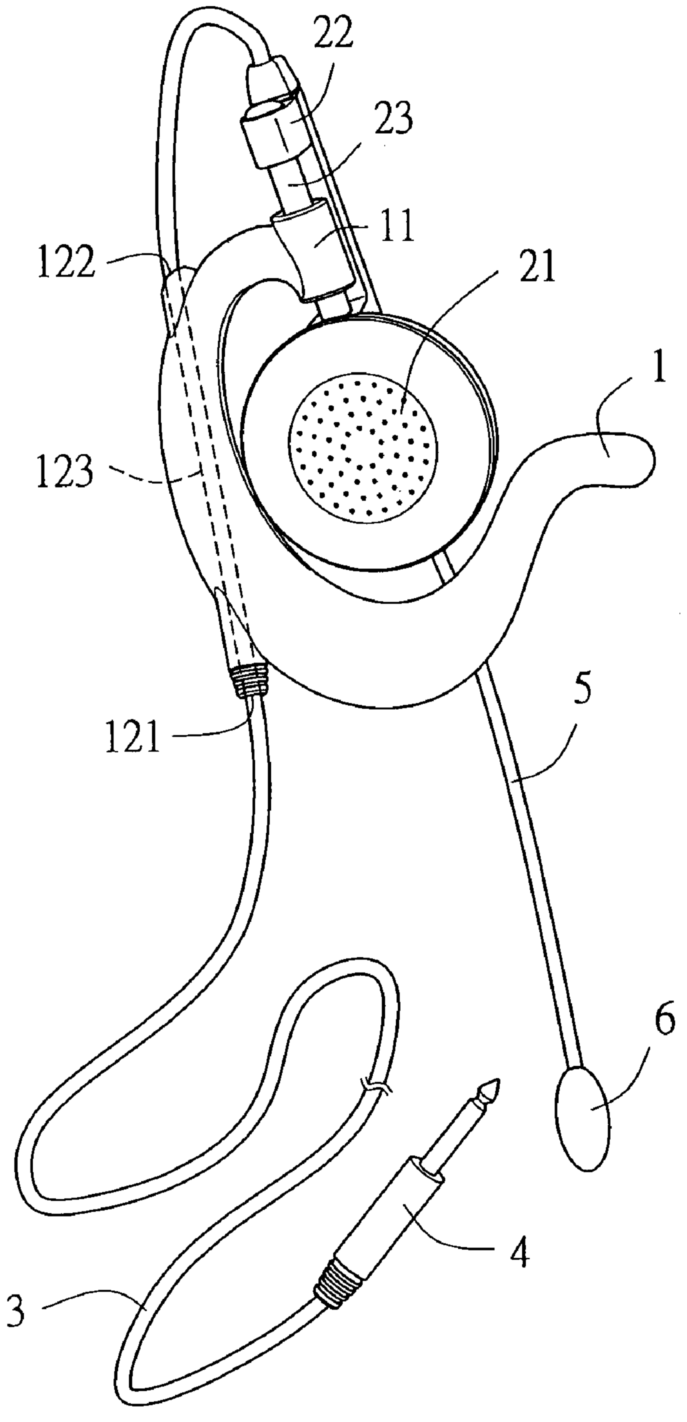
Figure 4A:
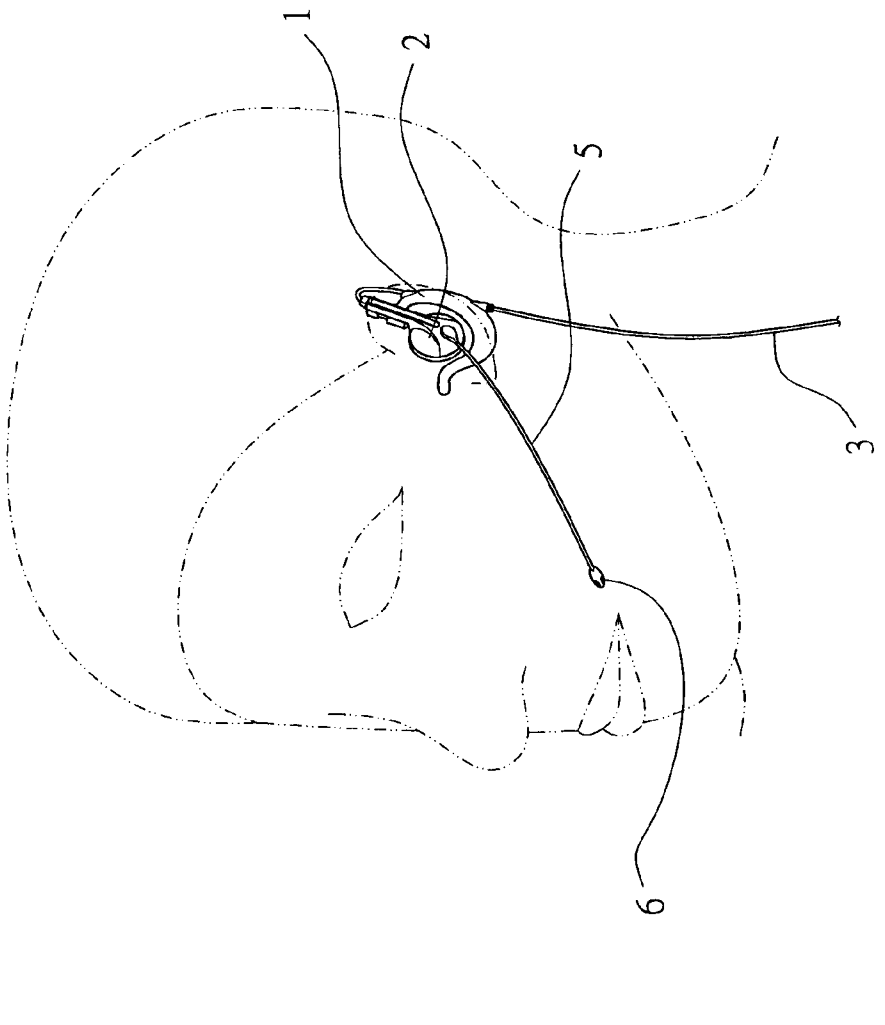
FIG. 4(*a*) & FIG. 4(*b*) show the present invention being applied on users' ear.
Figure 4B:
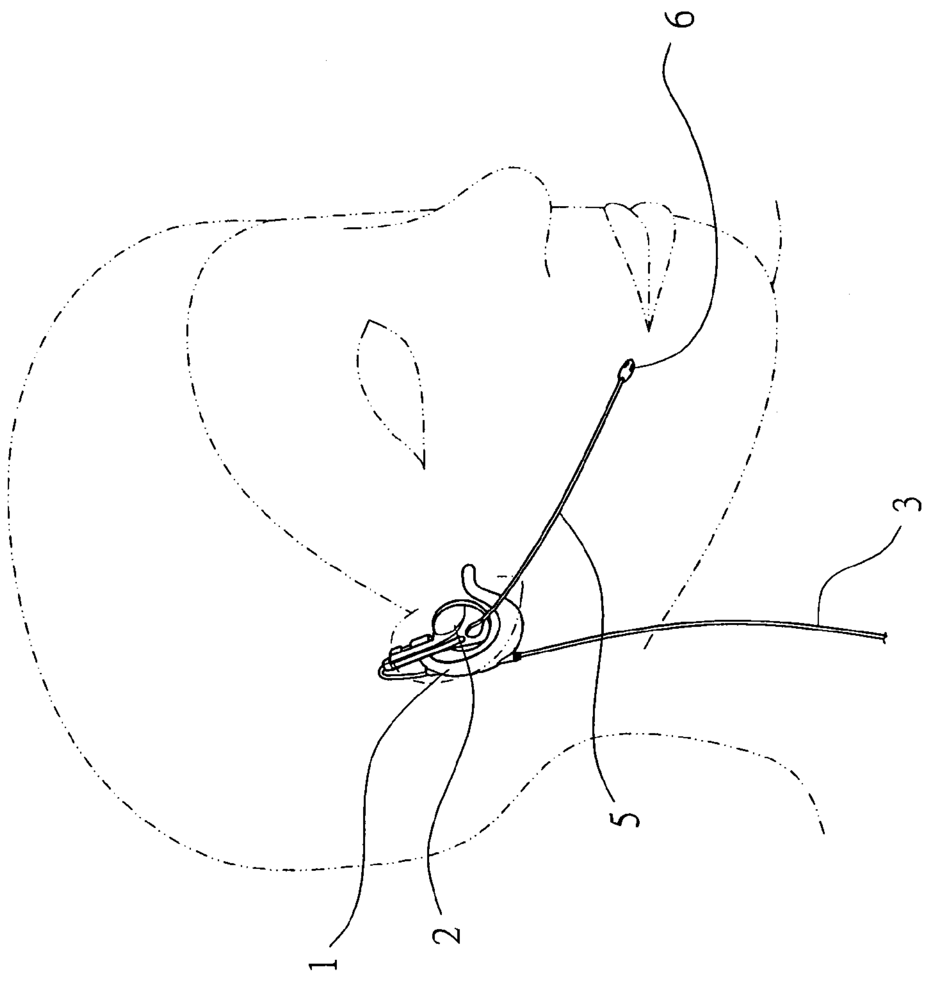

FIG. 3(*a*) & FIG. 3(*b*) disclose a better embodiment of the present invention. The device includes a C-shaped hook 1 with a sleeve 11 on top end thereof, a wire entry 121, a wire exit 122, and a wire channel 123 are arranged on upper part of the C-shaped hook 1 in tangential direction, a main body of earphone 2 with a speaker 21 on lateral side and a limiting part 22 extending from top side thereof. An adjusting post 23 clipped on side of the limiting part 22 is sleeved in the sleeve 11 so as to move the main body 2 upwards or downwards, or turning right or left in a certain angle. A signal wire 3 inserts through the wire entry 121, the wire channel 123, the wire exit 122 and connects with the main body of earphone 2. A flexible tube 5 with one end pivoted to the lateral side of the main body of earphone 2 extends downwards and swings to-and-fro. A microphone 6 is disposed on the other end of the flexible tube 5 and is connected with the main body of earphone 2 by the flexible tube 5. The FIG. 3(*a*) & FIG. 3(*b*) show the above-mentioned embodiments for applying on the right and left ear respectively. The FIG. 4(*a*) & FIG. 4(*b*) show the above-mentioned embodiment being applied on users' right and left ear respectively.

It should be noted that the above description and accompanying drawings are only used to illustrated some embodiments of the present invention, not intended to limit the scope thereof. Any modification of the embodiments should fall within the scope of the present invention.

What is claimed is:

1. An adjustable ear-hook earphone with a microphone comprising a C-shaped hook with a sleeve on top end thereof;

a wire entry, a wire exit, and a wire channel arranged on upper part of the C-shaped hook in tangential direction to together form a substantially straight passage for a wire;

a main body of earphone with a speaker mounted on lateral side and a limiting part extending from top side thereof, an adjusting post clipped on lateral side of the limiting part;

wherein the outer diameter of the adjusting post corresponds to the inner diameter of the sleeve so that the adjusting post is sleeved into the sleeve to allow the main body of earphone to turn left or right at a certain angle as well as moving upwards or downwards;

a flexible tube with one end pivoted to the lateral side of the main body of earphone and extending downwards; the flexible tube swings to and fro;

a microphone disposed on one end of the flexible tube and connected with the main body of earphone by the flexible tube, and a signal wire passing through the entry, the wire channel, the wire exit, and then being connected to the main body of earphone, wherein the signal wire is routed directly from the wire entry to enter the main body of the earphone.

2. The adjustable ear-hook earphone with a microphone as claimed in claim 1, wherein the certain angle ranges from 0 to 210 degrees.

3. The adjustable ear-hook earphone with a microphone as claimed in claim 1, wherein the adjusting post further having a hollow channel for accommodating the signal wire.

4. The adjustable ear-hook earphone with a microphone as claimed in claim 1, wherein the limiting part of the main body of earphone further having a wire accommodating slot for housing the signal wire therein.

5. An adjustable ear-hook earphone with a microphone comprising:

a C-shaped hook with a sleeve on top end thereof;

a wire entry, a wire exit, and a wire channel arranged on upper part of the C-shaped hook in tangential direction to together form a substantially straight passage for a wire;

a main body of the earphone with a speaker mounted on lateral side and a limiting part extending from top side thereof, an adjusting post clipped on lateral side of the limiting part;

wherein the outer diameter of the adjusting post corresponds to the inner diameter of the sleeve so that the adjusting post is sleeved into the sleeve to allow the main body of earphone turning left or right in a certain angle as well as moving upwards or downwards; and a signal wire passing through the entry, the wire channel, the wire exit, and then being connected to the main body of the earphone, wherein the signal wire is routed directly from the wire entry to enter the main body of the earphone.

6. The adjustable ear-hook earphone with a microphone as claimed in claim 5, wherein the certain angle ranges from 0 to 210 degrees.

7. The adjustable ear-hook earphone with a microphone as claimed in claim 5, wherein the adjusting post of the main body of the microphone further having a hollow channel for accommodating the signal wire.

8. The adjustable ear-hook earphone with a microphone as claimed in claim 5, wherein the limiting part of the main body of the earphone further having a wire accommodating slot for housing the signal wire therein.

9. The adjustable ear-hook earphone with a microphone as claimed in claim 5, wherein the adjustable ear-hook earphone with a microphone further having a flexible tube with one end pivoted to the lateral side of the main body of the earphone and extending downwards; the flexible tube swings to and fro, a microphone disposed on one end of the flexible tube and connected with the main body of the earphone by the flexible tube.

* * * * *